United States Patent
Bridgelall et al.

[11] Patent Number: 5,861,615
[45] Date of Patent: *Jan. 19, 1999

[54] PALM SCANNER

[75] Inventors: Raj Bridgelall, Mount Sainai; Joseph Katz, Stony Brook; David P. Goren, Ronkonkomo; Paul Dvorkis, Stony Brook; Yajun Li, Oakdale, all of N.Y.

[73] Assignee: Symbol Technologies, Inc., Holtsville, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 595,162

[22] Filed: Feb. 1, 1996

Related U.S. Application Data

[63] Continuation-in-part of Ser. No. 37,143, Mar. 25, 1993, Ser. No. 715,267, Jun. 14, 1991, Pat. No. 5,235,167, Ser. No. 981,448, Nov. 25, 1992, Pat. No. 5,478,997, and Ser. No. 28,107, Mar. 8, 1993, Pat. No. 5,408,081, and a continuation of Ser. No. 153,053, Nov. 17, 1993, Pat. No. 5,504,316, which is a continuation-in-part of Ser. No. 868,401, Apr. 14, 1992, Pat. No. 5,280,165, which is a division of Ser. No. 520,464, May 8, 1990, Pat. No. 5,168,149.

[51] Int. Cl.⁶ .......................................... G06K 7/10
[52] U.S. Cl. ............................... 235/462; 235/472
[58] Field of Search ..................... 235/462, 472, 235/467

[56] References Cited

U.S. PATENT DOCUMENTS

| | | | |
|---|---|---|---|
| 4,251,798 | 2/1981 | Swartz et al. | 235/462 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,418,276 | 11/1983 | Yatsunami | 235/462 |
| 4,460,120 | 7/1984 | Shepard et al. | 235/472 |
| 4,766,297 | 8/1988 | McMillan | 235/455 |
| 4,766,299 | 8/1988 | Tierney et al. | 235/472 |
| 4,794,239 | 12/1988 | Allais | 235/462 |
| 4,871,904 | 10/1989 | Metlitsky et al. | 235/467 |
| 4,939,356 | 7/1990 | Rando et al. | 235/434 |
| 5,115,121 | 5/1992 | Bianco et al. | 235/467 |
| 5,117,098 | 5/1992 | Swartz | 235/472 |
| 5,142,131 | 8/1992 | Collins, Jr. | 235/472 |
| 5,189,291 | 2/1993 | Siemiatkowski | 235/472 |
| 5,191,197 | 3/1993 | Metlitskey et al. | 235/472 |
| 5,198,650 | 3/1993 | Wike, Jr. | 235/472 |
| 5,214,270 | 5/1993 | Rando | 235/472 |
| 5,221,832 | 6/1993 | Collins, Jr. et al. | 235/467 |
| 5,237,161 | 8/1993 | Grodevant | 235/462 |
| 5,340,971 | 8/1994 | Rockstein | 235/472 |
| 5,369,262 | 11/1994 | Dvorkis | 235/472 |
| 5,401,948 | 3/1995 | Krichever et al. | 235/462 |
| 5,468,951 | 11/1995 | Knowles et al. | 235/472 |

FOREIGN PATENT DOCUMENTS 3-250276  11/1991  Japan .

*Primary Examiner*—Donald T. Hajec
*Assistant Examiner*—Karl Frech
*Attorney, Agent, or Firm*—Fish & Richardson P.C.

[57] ABSTRACT

A hand-held optical reader for reading printed indicia on a remote target includes a light source for generating a scanning light beam and a detector for detecting the light reflected from the printed indicia. The light source and detector are housed within a housing having a window through which the light beam passes from the source to the target for reflection from the target to the detector. The housing includes parallel front and rear faces, each being generally rectangular in shape and having a lower portion and upper portion. The front and rear faces are joined by a substantially planar base face at their lower edges. The window is disposed in the front face with the reader being ergonomically configured so as be comfortably held in the hand of a user, with the user's palm adjacent the rear face to enable the user to direct the scanning light beam at a remote target.

15 Claims, 3 Drawing Sheets

PALM SCANNER

REFERENCE TO RELATED APPLICATIONS

This application is a Continuation of U.S. patent application Ser. No. 08/153,053, filed Nov. 17, 1993 now U.S. Pat. No. 5,504,316, which is a Continuation-in-Part of U.S. patent application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149.

This application is also a Continuation-in-Part of U.S. patent application Ser. No. 08/037,143, filed Mar. 25, 1993, and Ser. No. 07/715,267, filed Jun. 14, 1991, now U.S. Pat. No. 5,235,167.

This application is also a Continuation-in-Part of Ser. No. 07/981,448, filed Nov. 25, 1992, now U.S. Pat. No. 5,478, 997.

This application is further a Continuation-in-Part of Ser. No. 08/028,107, filed Mar. 8, 1993, now U.S. Pat. No. 5,408,081.

TECHNICAL FIELD

This invention relates generally to hand-held scanning systems which "read" indicia, such as barcode symbols, and in particular to systems and methods for scanning one-dimensional (1-D) and two-dimensional (2-D) barcode symbols with a first scan pattern that is relatively small and dense so as to be visible to the user, and thereafter a second, larger and more robust scan pattern for decoding. The invention also relates to scanners operable in both portable (hand-held) and surface mounted (hands-free) modes for reading various types of indicia. The invention further relates to novel miniature assemblies capable of 1-D and 2-D scanning.

BACKGROUND ART

Various optical readers and scanning systems have been developed for reading barcode symbols appearing on a label or the surface of an article. The barcode symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alpha-numerical characters intended to be descriptive of the article or some characteristic of it. Such characters typically are represented in digital form, and utilized as an input to a data processing system for applications in point-of-sale processing, inventory control and the like. Scanning systems of this general type have been disclosed, for example, in U.S. Pat. Nos. 4,251,798; 4,360,798; 4,369,361; 4,387,297; 4,409,470 and 4,460,120, all assigned to the assignee of the present invention.

One embodiment of such a scanning system, as disclosed in some of the above patents, resides in, inter alia, a hand-held, portable laser scanning head supported by a user. The scanning head is configured to enable the user to aim the head at a target to emit a light beam toward a symbol to be read. The light source is a laser scanner typically in the form of a gas or semiconductor laser element. Use of semiconductor devices as the light source in scanning systems is particularly desirable because of the small size, low cost and low power requirements of semiconductor lasers. The laser beam is optically modified, typically by a lens, to form a beam spot of a certain size at the target distance. Preferably, the beam spot size at the target distance is approximately the same as the minimum width between regions of different light reflectivity, i.e., the bars and spaces of the symbol.

The barcode symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements are concatenated together to form the complete barcode symbol, with each character of the message being represented by its own corresponding group of elements. In some symbologies a unique "start" and "stop" character is used to indicate where the barcode begins and ends. A number of different barcode symbologies exist. These symbologies include UPC/EAN, Code 39, Code 128, Codabar, and Interleaved 2 or 5.

In order to increase the amount of data that can be represented or stored on a given amount of surface area, several new barcode symbologies have recently been developed. One of these new code standards, Code 49, introduces a "two-dimensional" concept by stacking rows of characters vertically instead of extending the bars horizontally. That is, there are several rows of bar and space pattern, instead of only one row. The structure of Code 49 is described in U.S. Pat. No. 4,794,239, which is hereby incorporated by reference.

A one-dimensional single-line scan, as ordinarily provided by hand-held readers, functions by repetitively scanning the light beam in a line or series of lines across the symbol using a scanning component such as a mirror disposed in the light path. The scanning component may either sweep the beam spot across the symbol and trace a scan line across and past the symbol, or scan the field in view of the scanner, or do both.

Scanning systems also include a sensor or photodetector, usually of semiconductor type, which functions to detect light reflected from the symbol. The photo-detector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alpha-numeric characters so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

More sophisticated scanning, described in U.S. Pat. No. 5,235,167, assigned to the common assignee, and incorporated herein by reference, carries out selective scanning of 1-D and 2-D barcodes. Preliminary information, such as the barcode type and size, is preliminarily decoded during an aiming mode of operation when a relatively narrow and visible raster pattern is impinged on the target. Based upon the preliminary information, received by the scanner in the form of light reflected from the target, converted to an electrical signal and decoded, an appropriately sized raster scan pattern is generated. If the barcode pattern is found to be skewed or misaligned with respect to the direction of the raster scanning pattern, the pattern is generated with an orientation in alignment with the barcode.

Aligning the scan pattern to the barcode is awkward, especially for long range scanning. If a barcode is not horizontally positioned on, for example, a container, the user is forced to position the scanner sideways in order to scan the barcode. One possible solution, described in the aforementioned U.S. Pat. No. 5,235,167, is to control the scanner to self-orient the scan pattern to the orientation of the barcode.

Scanning 2-D, or PDF, barcodes with a raster pattern also presents a similar problem. At certain distances, the visibility of a 2-D raster pattern is poorer than that of a single line, and orienting the barcode with the scan lines is not effortless. Assuming the pattern to be amply visible, the user may tend to position the 2-D barcode horizontally under a scan lamp. However, it would be ideal if no aligning is required. For example, a 2-D barcode may have been a photocopy vertically aligned onto a page. Upon scanning, the user may first subconsciously attempt to present the page horizontally, and thus present the barcode vertically. Without ability by the scanner to instantaneously sense barcode orientation, and then position a raster pattern to scan it, the user will be forced to realign the page vertically.

Following alignment of the scan pattern to the barcode, the pattern is then increased in width so as to fully span the length of the barcode, and if the pattern is determined to be a 2-D barcode, the height of the scan pattern is also increased so as to decode all of the barcode rows. However, the rate at which the raster pattern is increased in size is fixed and independent of the size of the barcode or the distance between the hand-held scanner and target. At a common rate of pattern size increase, depending upon the size of the barcode it may require from 0.1 to 2.0 seconds to open the scan pattern and decode the barcode. Distance to the target is another factor. Pattern size is incremented until the entire pattern is decoded. The size of each increment of increase is determined in part by the working range of the scanner. Very long range scanners, usable up to sixty feet, for example, may require smaller increments so that the patterns do not grow too fast at the end of a working range where much of the information, including start and stop codes, concerning attributes of the barcode resides. Hence, it would be desirable to control the rate at which the scan pattern grows to decode the barcode depending upon the characteristics of the barcode itself.

The scanner unit must be compact, energy efficient, and capable of scanning both 1-D and 2-D barcodes. The unit preferably will also be convertible between hand and surface support applications. The scan pattern will preferably be optimized in accordance with whether the unit is in hand held or surface supported modes of operation, whether it is in a presentation type of operation (wherein the indicia are passed under a scan lamp) or a pass through type of operation (supermarket type) and on the type of barcode or other indicia to be read.

DISCLOSURE OF THE INVENTION

A general object of this invention is to improve aim and shoot capabilities of hand-held barcode scanners. Other objects of this invention include miniaturizing the scan mechanism so as to enable the scanner to be conveniently hand-held, and compactly housing the scanner, and providing convertibility between hand-held and surface mount applications while automatically generating scan patterns optimized for the particular application and type of indicia being read.

In accordance with the present invention, a hand-held optical reader is provided for reading printed indicia on a remote target. The reader includes a light source for generating a light beam and a detector for detecting the light reflected from the printed indicia. The light source and detector are housed within a housing which includes a window through which a light beam from the light source passes to the target for reflection from the target to the detector. The housing has parallel front and rear faces, each having a generally rectangular shape, and lower and upper portions. The front and rear faces are joined by a substantially planer base face at their lower edges. The window is disposed in the front face of the reader which is ergonomically configured so as to be comfortably held in the hand of the user, with the user's palm adjacent the rear face, such that the user can easily direct the scanning light beam at a remote target.

Preferably, the side faces taper from the front face to the rear face, and the base plate has a radius of curvature substantially larger than the radius of curvature of the rounded upper portions of the front and rear faces. A grip may be beneficially provided on a portion of the external surface of the housing to provide a convenient surface at which the user can grip the reader housing. The light source preferably is a laser and includes a scan element for generating a flying spot beam.

A mount may be provided for the reader. The mount preferably includes a base portion which can be used to secure the mount to a fixed surface and a yoke with projecting spindle stubs from its upstanding arms for mounting the reader by locating the stubs in corresponding recesses in the reader housing such that the housing pivots about a horizontal axis on the yoke. An intermediate plate may be rotatably mounted on the base to allow rotation of the mounted housing about a vertical axis. Beneficially, the yoke is releasably attached to the intermediate plate. For certain applications, an extension element may be provided between the yoke and the intermediate plate for increasing the height of the mount. Beneficially, the yoke and intermediate element are releasably attached together using corresponding formations on the yoke and element. Corresponding formations on the extension element can be provided to allow releasably attachment of the yoke and intermediate element to respective ends of the extension element.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

As used in this specification, the terms "symbol" and "barcode" are intended to be broadly construed and to cover not only patterns composed of alternating bars and spaces of various widths, but also other one or two dimensional graphic patterns, as well as alphanumeric characters.

The invention provides a scanner system in which the scan pattern produced by a light beam is controlled to describe an omnidirectional scanning pattern, light reflected from a symbol is detected, and the scan pattern is thereafter controlled in response to the detected signals. The invention also provides a scanner system and method in which adjustment of the spatial coverage of the scan pattern of a scanning beam is automatically made at a responsively controlled rate to effect an appropriate type of scanning pattern depending upon the type of symbols to be read. The invention further provides a scanning system operation in which two different types of barcodes may be read, a standard linear barcode and a 2-D barcode. The invention provides a technique for determining the type of barcode, its angular orientation, and adjusts the spatial coverage or vertical sweep of the raster scanning beam to fully scan and read a 2-D barcode.

In accordance with a first aspect of the invention, the invention further produces scan patterns for reading indicia, optimized in dependence upon the operating mode of the scanner (portable or fixed) and other criteria. A portion of the barcode is initially scanned by projecting a light beam on the target containing the barcode, and scanning the beam using a pattern that is relatively small and dense so as to be visible to the user for aiming. A portion of the barcode is partially decoded to determine the type, and possible size, of the barcode, whether it is a 1-D or 2-D barcode and its angular orientation. A rotating Lissajous pattern is preferred for this purpose as it has been determined to be most robust, although other patterns can be used. If the symbol is found to be a 1-D barcode, the scan pattern is increased in size (opened) to a maximum size, at a prescribed rate, in conformance with the portion of the symbol previously decoded, and the rotating Lissajous pattern decodes the entire symbol. If the symbol is determined to be a 2-D barcode, the rotating Lissajous pattern is converted to a raster pattern, and increased in size at a prescribed rate to decode the barcode. In a preferred embodiment, the raster pattern precesses so as to align with the 2-D symbol and therefore read 2-D barcodes of different angular orientations with respect to the horizontal scanning pattern.

Figure 1A:
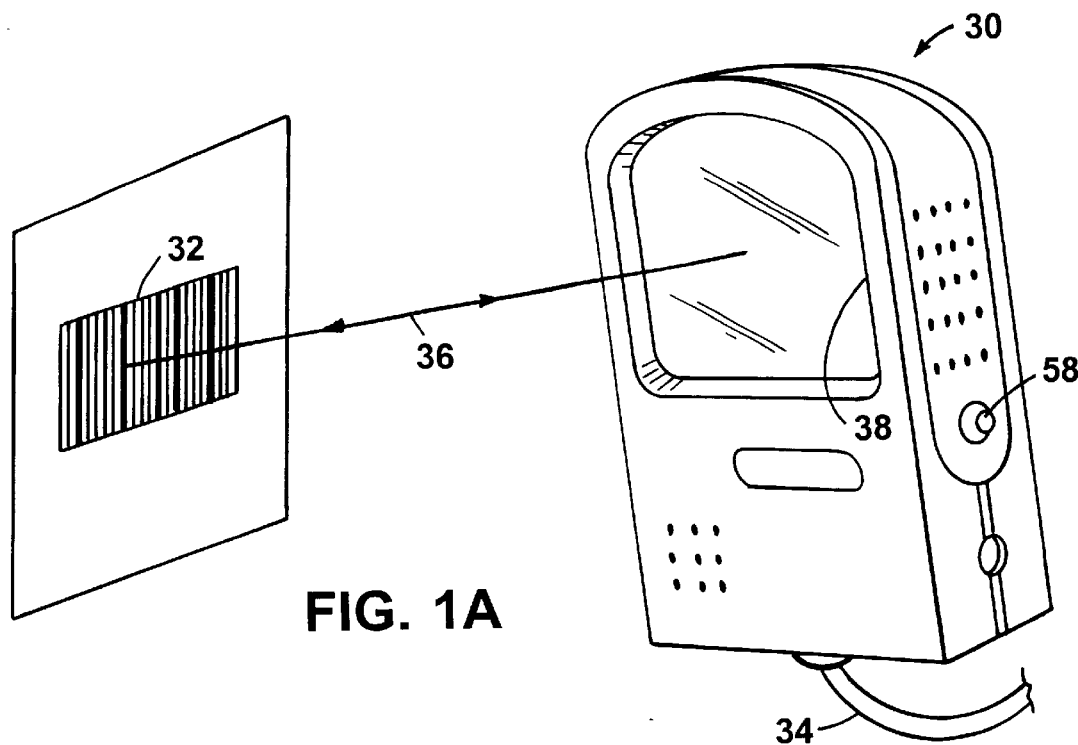
FIGS. 1A and 1B is a perspective view of a "palm-held" scanner, in accordance with one aspect of the invention.
Figure 1B:
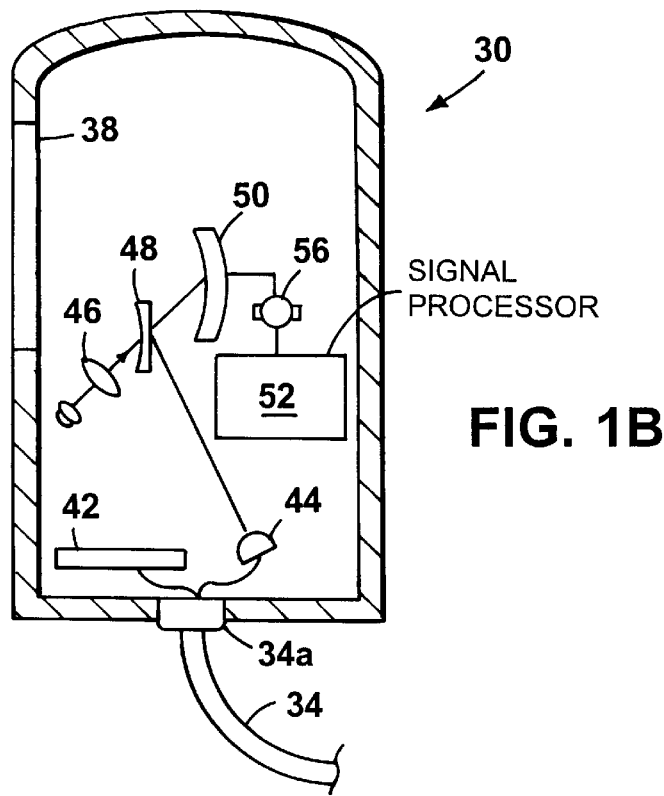

Thus, referring to FIG. 1A, a hand-held barcode scanner 30 is confined to be held in the palm of a user's hand and oriented in the direction of a barcode or other symbol 32 to be read. The scanner 30 is housed in a light-weight plastic housing 40 (FIG. 1B) containing a semiconductor laser light source 42, photodetector 44, optics 46, 48 and 50 and signal processing/control circuitry 52. Alternatively, the housing may be gun-shaped and provided with handle to enable the user to easily manually aim and shoot the light beam toward a symbol which may be remote from the housing, and an indicator which may be an audio source inside the housing to inform the user that the housing is positioned in the correct working range for reading bar code symbols. Such a housing is shown in FIG. 1 of U.S. Pat. No. 5,168,149, incorporated herein by reference. The circuitry in housing 40 may be powered by connection to a power source, or by batteries 54 to allow the unit to operate in a portable, wireless mode.

As further depicted in FIGS. 1A and 1B, a suitable lens 38, or multiple lens system, will focus the scanned beam onto the barcode symbol at an appropriate reference frame. The light source 42 is positioned to introduce a light beam into the axis of the lens 38, and the beam passes through a partially silvered mirror 48 and other lenses or beam-shaping structure as needed. An oscillating mirror 50 is connected to a scanning motor 56 that is driven by the control circuitry 52 in response to manual operation of a trigger 58 on the outside of the housing 40 (FIG. 1A). Signals to and from the control and signal processing circuitry 52 are carried by exit port 34a and line 34 to external equipment.

The scanner 30 may be adapted to scan different types of articles or for different applications by interchanging the scanning head with another through use of electrical connectors. Furthermore, the scanning module may be implemented within a self-contained data acquisition system including one or more such components as keyboard, display, printer, data storage, application software and data bases (see, for example, U.S. Pat. No. 4,409,470), and may also include a radio or other type of communications interface for communication with a local area network, telephone exchange network or radio broadcast system.

Figure 2A:
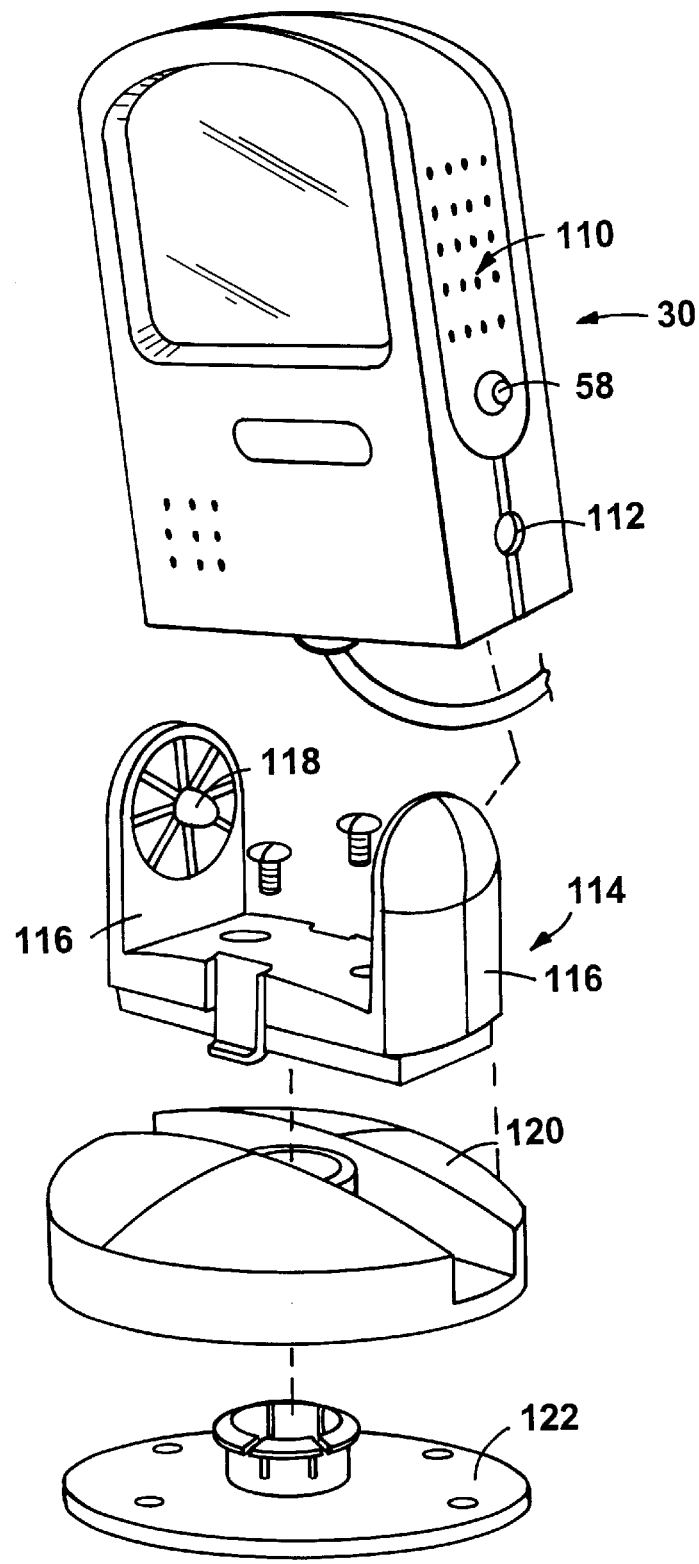
FIGS. 2A and 2B are exploded views of two embodiments of palm-held scanner housings, together with a surface mount fixture, in accordance with the invention.

Referring to FIG. 2A, the palm scanner module 30, now shown in more detail, incorporates a rubber grip 110 around the crown of the module slightly above a pair of indentations 112 for seating the module in a mounting bracket 114, enabling the module to pivot about a horizontal axis. The bracket 114 includes a pair of upstanding supports 116 having spindles 118 for rotatably supporting the module. The bracket 114 in turn is mounted on a base 120 that is turreted to a mounting plate 122 and hence is able to rotate about a vertical axis. The scanner module 30 can be easily removed from the bracket by lifting with a force sufficient to enable the spindles 118 to slip from the indentations 112.

The outgoing beam 36 is generated in the scanner 30 by a laser diode or the like, and directed to impinge upon the barcode symbol 32 that ordinarily is positioned a few inches from the front of the scanner. However, other applications may require scanning a target that is at a considerable distance, e.g., 60 feet from the scanner. The outgoing beam 36 is scanned using various patterns, one being a linear raster. The user positions the hand-held unit so that the scan pattern traverses the symbol to be read. Light reflected from the symbol is received by the unit 30 and detected by a photodetector 44 within the housing. Light beam 36, in both directions, passes through a transparent or translucent window 38 that preferably is approximately square in shape to accommodate 2-D as well as 1-D pattern scanning.

Preferably, the specific pattern produced by the scanner, in accordance with an important aspect of the invention, is a pattern that is optimized for a particular classification of indicia and depending on whether the scanner is operating in a portable mode or is mounted in its fixture. A scan pattern is deemed to be optimized if it reads and decodes a prescribed pattern in a minimum amount of time, and within reasonable economic constraints.

If the scanner is operated in the fixed mode, with the palm held module 30 is mounted in bracket 114 and the module 30 directed to a region across which items bearing indicia, such as a barcode, to be read are passed, the rotational orientation of the scan pattern with respect to barcode is indeterminate. On the other hand, if the scanner is operated in the aim and shoot mode, with the module 30 separated from the bracket, the scanning pattern may be manually aligned with the barcode. The specific pattern produced should be optimized for decoding barcodes of the particular classification of barcode being read.

Figure 2B:
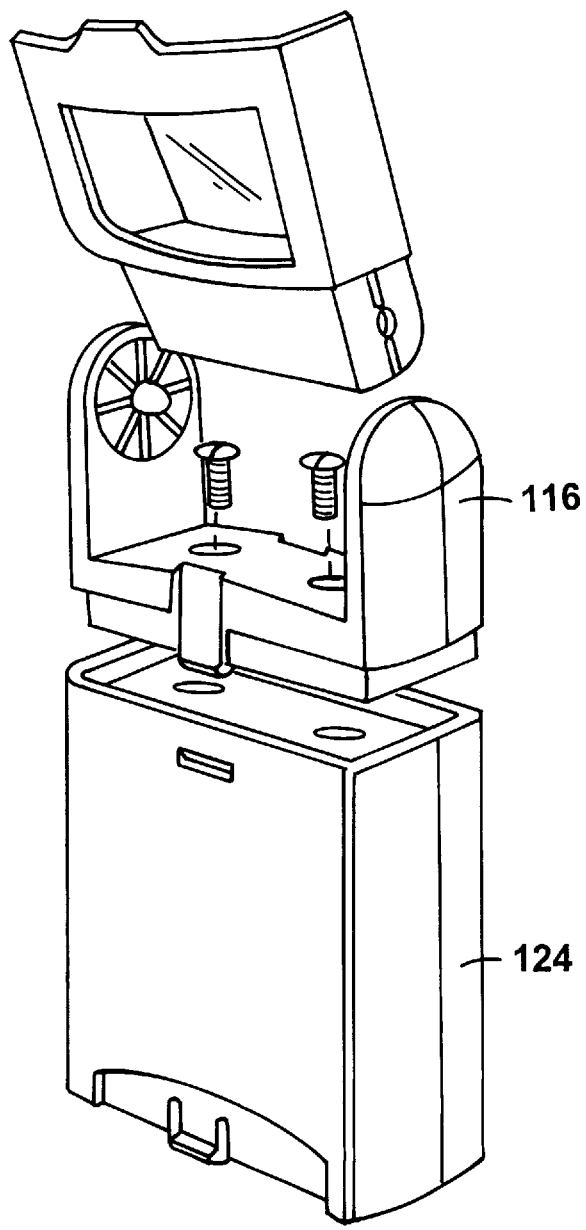

Hence, in accordance with an aspect of the invention, a suitable scan 2-D barcode. At the same time, it is determined whether the scanner is in the portable mode or fixed mode of operation (the order of sequence of the first two steps is arbitrary). This may be carried out by detecting the presence of the module 30 in bracket 114 by means of, e.g., a mechanical or magnetic proximity switch in the base of the fixture (not shown in FIGS. 2A, 2B; however, see U.S. application Ser. No. 08/028,107, filed Mar. 8, 1993, incorporated herein by reference), or by a manual switch located on module 30 or elsewhere.

The particular scanning patterns produced for decoding 1-D or 2-D barcodes when the scanner is operated in portable and fixed modes can be varied for specific applications and modules of particular optical characteristics. What is important is that the scanner is adaptive, controlled manually but preferably automatically, to produce decoding scan patterns that are optimized, that is, as robust as practical with respect to the operating mode selected and the classification of indicia being read.

Preferably, the scan pattern is also optimized in dependency on whether scanning is carried out by a presentation type (under a scan lamp) or a pass through (supermarket) type reader. In the presentation type reader, an article carrying a barcode or other symbol to be read is brought to the reader or the reader is brought to the article. Since reading is carried out in very close proximity to the barcode, there is no need for aiming. In the pass through reader, the article bearing a barcode is swiped past a scanning pattern produced by a fixed source of light beams. These two modalities present different decoding requirements to barcode readers (in the pass through mode of reading, the article swipes through the scan region relatively quickly, whereas in the presentation mode, the barcode is relatively stationary when read). Hence, if reading is carried out in the pass through mode, and the barcode is not very truncated (that is, the barcode is thin), a scanning pattern producing lines that are more sparsely spaced but more often repeated is preferred because it is more likely to traverse the barcode. That is, the faster the swipe, the thicker the barcode should be and hence a scanning pattern, such as a rotating Lissajous pattern, optimized for a relatively thick barcode pattern is preferred.

Another form of scanner that can produce the required two-dimensional scanning patterns is of a type implementing a scan element supported by a holder structure mounted on a mylar motor to produce oscillatory movements, the arrangement being mounted on a printed circuit board within a housing that can be manually held. The scanning motor and arrangement may be made of components formed essentially of molded plastic material, and utilizing of a mylar leaf spring to limit scan. See, for example, application Ser. No. 07/812,923, filed Dec. 24, 1991, assigned to the assignee of this invention and incorporated herein by reference.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A reader arrangement for reading printed indicia, the reader arrangement including:
   a reader having:
      a reading beam source comprising a laser beam source that generates a reading beam continuously or repeatedly while the reader is held by a user,
      a reading beam detector, and
      a window through which the reading beam passes, the reading beam source causing an omnidirectional multiline pattern to come from the window,
   the reader having broad front and rear faces and narrow side faces, the window being provided in and recessed within the front face, the front face having an upper end and a lower end, the window having a midpoint that is disposed closer to the front face's upper end than to the front face's lower end; and
   a stand on which the reader is releasably mountable and pivotable about horizontal and vertical axes, the stand permitting the reader to be pivoted about a horizontal axis into a position at an acute angle to a vertical axis to direct the reading beam onto a surface on which the stand is disposed;
   the reader being shaped to be held by a user with the window facing away from the user for hand-held reading, and the reader arrangement being configured such that the reader is mountable on the stand with the window substantially unobscured for surface-mounted reading;
   wherein, when the reader is mounted on the stand in a position that causes the reading beam to pass through the window in a substantially horizontal direction, the reader arrangement has a height, a depth, and a width such that each of the distances defined by the depth and the width, respectively, is less than the distance defined by the height.

2. The reader arrangement as claimed in claim 1, wherein the stand comprises a base portion having a base, and the stand comprises a yoke including yoke spindles for engaging corresponding recesses in opposing sides of the reader and the base portion for securing the stand to a fixed surface.

3. The reader arrangement as claimed in claim 2, wherein the stand further comprises an intermediate plate to which the yoke is releasably attachable, the intermediate plate being rotatably mounted on the base about a vertical axis of rotation.

4. The reader arrangement as claimed in claim 3 further including an extension element interposable between the yoke and the intermediate plate for increasing the height of the stand.

5. The reader arrangement as claimed in claim 4 wherein corresponding formations are provided on the yoke and the intermediate element for releasably attaching the yoke and the intermediate element together.

6. The reader arrangement as claimed in claim 5, wherein the corresponding formations are provided on the extension element to allow the yoke and the intermediate plate to be releasably attached to respective ends of the extension element.

7. The reader arrangement as claimed in claim 1, wherein the window and front face of the reader are substantially unobscured by the stand, when mounted thereon, to allow simple and accurate directing of the reader towards an indicia to be read, and the reader is configured to be held in the hand of the user with the rear face abutting a palm of the user and opposing side faces being gripped by the user's thumb and fingers respectively, such that the window faces forwardly to enable the user to direct a scanning light beam at the indicia.

8. The reader arrangement as claimed in claim 1 wherein the stand further includes an intermediate plate rotatably mounted on the base to allow rotation of the reader about a vertical axis.

9. The reader arrangement as claimed in claim 1, wherein the reader is arranged such that the reading beam issues substantially perpendicular to the front face.

10. The reader arrangement as claimed in claim 1, wherein the stand is adapted to be mounted on a surface of any inclination including horizontal and perpendicular.

11. The reader arrangement as claimed in claim 1 wherein the reader is mountable on the stand with the front face substantially vertical and the window is located at the upper end of the front face when the reader is mounted on the stand allowing elevation of the reading beam.

12. The reader arrangement as claimed in claim 1, wherein the side faces taper from the front face to the rear face.

13. The reader arrangement as claimed in claim 1, wherein the reader has a base face that is curved having a radius of curvature substantially larger than the radius of curvature of the rounded upper portions of the front and rear faces.

14. The reader arrangement as claimed in claim 1, wherein the reader has a housing including at least one rubber grip portion on an external surface of the housing.

15. The reader arrangement as claimed in claim 1, wherein the reading beam source includes a flying spot scanner.

* * * * *